T. H. B. CORRELL.
Handles of Picks.

No. 148,038.           Patented March 3, 1874.

UNITED STATES PATENT OFFICE.

THOMAS H. B. CORRELL, OF CANTON, OHIO.

IMPROVEMENT IN HANDLES FOR PICKS.

Specification forming part of Letters Patent No. 148,038, dated March 3, 1874; application filed January 26, 1874.

*To all whom it may concern:*

Be it known that I, THOMAS H. B. CORRELL, of Canton, in the county of Stark and State of Ohio, have invented certain new and useful Improvements in Handles for Picks; and that the following is a full, clear, and exact specification thereof, which will enable others skilled in the art to make and use the said invention.

My invention is designed to obviate the expense and difficulty attending the ordinary attachment of the handle to picks and mattocks by means of an eye forged in the pick; to which end it consists in securing an eyeless pick to the handle by means of two L-shaped irons bolted to the handle and pick, as is hereinafter more fully shown, thereby saving the expense of forging the eye, affording a protection to the handle at the end, and strengthening the handle and holding it securely from working loose while in use. Said invention also consists in the combination of a pair of lips or side pieces with the pick and end of handle, as is hereinafter more fully shown, by which the pick-handle is prevented from splitting at the end from any side strains brought on it while in use.

Figure 1:
Figure 2:
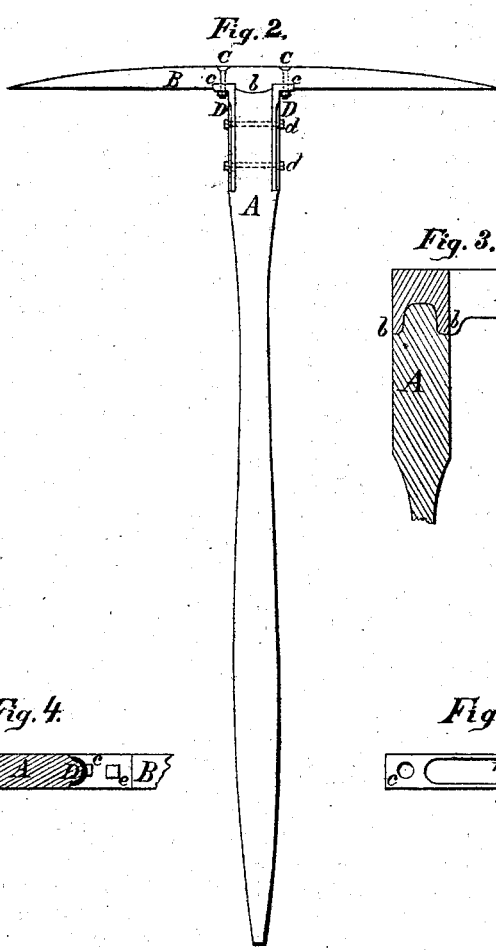
Figure 3:
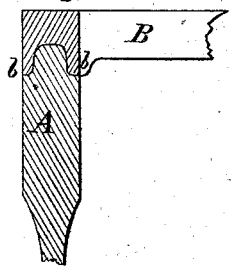
Figure 4:
Figure 5:
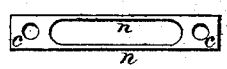

In the accompanying drawing, Figures 1 and 2 are end and side views of a pick embodying my improvement. Fig. 3 is a cross-section of said pick, taken through the handle. Fig. 4 is a cross-section through the handle; Fig. 5, a top plan of handle attachment; and Fig. 6, a side view of pick, showing a modified form of handle attachment.

A is the handle, which is ordinarily made of wood, in the general form shown. B is the pick or mattock, of any of the ordinary designs, but made without an eye. D D are the handle-irons, made of an L form, and secured to the handle by bolts $d$ $d$, running through said handle and iron. The upper ends $c$ $c$ of these irons are attached to the pick B by bolts C C, passing through said ends and holes drilled in said pick, as shown by dotted lines.

When the pick is to be used on very solid work, it may be found desirable to let the ends $c$ $c$ up into the pick B, as shown in Fig. 2, but this is usually unnecessary.

In order to prevent the handle A from splitting at the lower end, as it might do from the side strains from the bolts $d$ $d$ passing through it, in case the pick was twisted sidewise, I punch into the lower side of pick B, and draw down the lips $b$ $b$, as shown in Figs. 2 and 3, and then fit the end of the handle A between said lips, as shown in Fig. 3, thus securing said end from splitting open.

Figure 6:
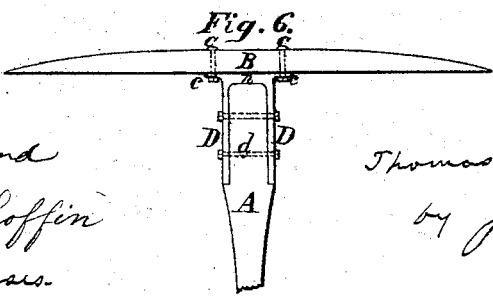

Fig. 6 shows a modified form of handle attachment, made of malleable iron and in one piece, the pieces D being made in a curved form in section, as shown in Fig. 4, and the two pieces D D being united by side flanges $n$ $n$, as shown in Figs. 5 and 6, which flanges $n$ serve the same purpose as the lips $b$ in Fig. 2, the handle A fitting between them, as shown in Fig. 6. Bolts $d$ $d$ secure the pieces D to the handle A, and bolts C unite the pick B to the ends $c$, as in the first form shown.

For ordinary heavy work, I prefer the construction shown in Fig. 2, where, as in the last-shown form, the pieces D may be made of a curved section to secure the handle A more firmly; and for lighter work, I should dispense with the lips $b$, or would use the attachment D $n$ D, (shown in Fig. 6,) as this form could be made cheaply. It would save the work of drawing down the lips $b$, and, if made of good iron, would be of ample strength for all ordinary purposes.

What I claim as my invention is—

1. The attachment of a pick or mattock handle by means of two L-irons placed between the handle and pick or mattock, and secured to each by through-bolts, substantially as and for the purpose herein specified.

2. The lips $b$ $b$ on the pick B, in combination with the handle A, secured between the irons D D, constructed as and for the purpose specified.

As evidence of the foregoing, witness my hand this 8th day of January, A. D. 1874.

THOMAS H. B. CORRELL.

Witnesses:
 JOB ABBOTT,
 CHARLES F. PERKINS.